United States Patent
Liao

(10) Patent No.: US 8,247,931 B2
(45) Date of Patent: *Aug. 21, 2012

(54) VOICE COIL MOTOR WITH ROTATION STOPPING MEANS

(75) Inventor: Chia-Hung Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 293 days.

This patent is subject to a terminal disclaimer.

(21) Appl. No.: 12/639,148

(22) Filed: Dec. 16, 2009

(65) Prior Publication Data

US 2010/0270870 A1    Oct. 28, 2010

(30) Foreign Application Priority Data

Apr. 23, 2009 (CN) .......................... 2009 1 0301792

(51) Int. Cl.
 *H02K 41/035* (2006.01)
(52) U.S. Cl. .................................................. 310/12.16
(58) Field of Classification Search ............... 310/12.02, 310/12.16, 12.24–12.26, 12.31, 12.33; 359/694–704, 359/811–814, 819–828
See application file for complete search history.

(56) References Cited

U.S. PATENT DOCUMENTS

| | | | | |
|---|---|---|---|---|
| 4,523,114 A * | 6/1985 | Smith | | 310/24 |
| 6,798,102 B2 * | 9/2004 | Adachi | | 310/78 |
| 6,897,597 B1 * | 5/2005 | Armiroli et al. | | 310/263 |
| 7,154,199 B2 * | 12/2006 | Yasuda | | 310/12.24 |
| 7,715,131 B2 * | 5/2010 | Chou et al. | | 359/824 |
| 7,851,952 B2 * | 12/2010 | Liao | | 310/12.16 |
| 7,916,413 B2 * | 3/2011 | Liao | | 359/824 |
| 7,969,671 B2 * | 6/2011 | Liao | | 359/824 |

FOREIGN PATENT DOCUMENTS

| | | |
|---|---|---|
| TW | M300309 U | 11/2006 |
| TW | M304689 U | 1/2007 |

* cited by examiner

*Primary Examiner* — Tran Nguyen
(74) *Attorney, Agent, or Firm* — Altis Law Group, Inc.

(57) ABSTRACT

A voice coil motor includes a stationary magnetic field generator a moveable magnetic field generator, and an elastic assembly. The stationary magnetic field generator includes a supporting frame and permanent magnetic elements mounted to peripheral sides of the supporting frame. The supporting frame has a first receiving space defined therein and includes first stopping portions formed in the first receiving space. The moveable magnetic field generator is moveably received in the first receiving space, and includes a core member and a coil wrapped around the core member. The core member includes second stopping portions. The second stopping portions are configured for engaging with the at least one first stopping portion to prevent the moveable magnetic field generator from rotating about a central axis of the core member. The elastic assembly elastically connects the moveable magnetic field generator and the stationary magnetic field generator.

13 Claims, 7 Drawing Sheets

VOICE COIL MOTOR WITH ROTATION STOPPING MEANS

BACKGROUND

1. Technical Field

The present disclosure relates to voice coil motors with rotation stopping means.

2. Description of Related Art

Voice coil motors (VCMs) are widely used, for example, as lens actuators in camera modules.

A typical VCM includes a stationary magnetic field generator, a moveable magnetic field generator, at least one elastic member elastically connecting the stationary magnetic field generator and the moveable magnetic field generator, and a case receiving all the above-mentioned elements therein. The moveable magnetic field generator is moveably received in the stationary magnetic field generator.

When a lens module is screwed into the moveable magnetic field generator, the at least one elastic member may be easily broken because a torque applied to the moveable magnetic field generator by the lens module. This decreases a reliability of the VCM.

Therefore, a voice coil motor which can overcome the above mentioned problems is desired.

DETAILED DESCRIPTION

Figure 1:
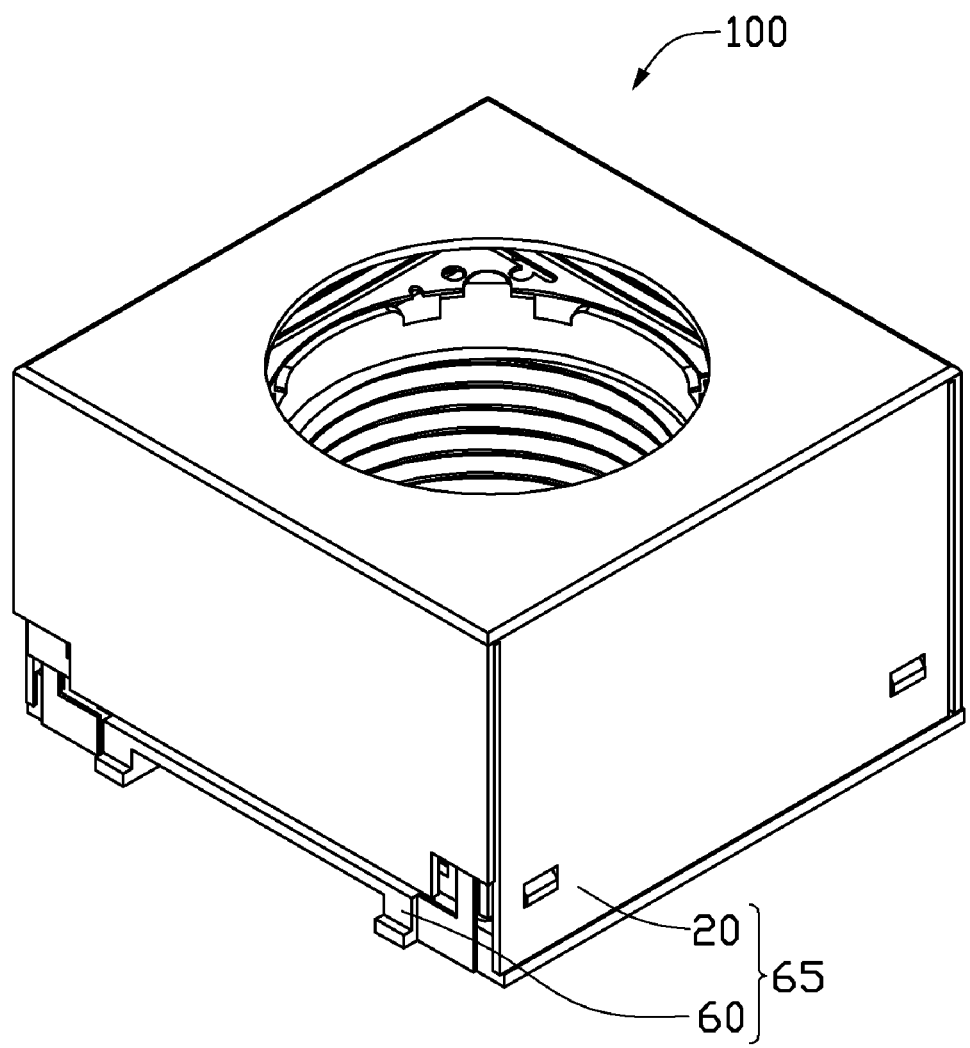
FIG. 1 is an isometric and schematic view of a voice coil motor, according to a first exemplary embodiment.
Figure 2:
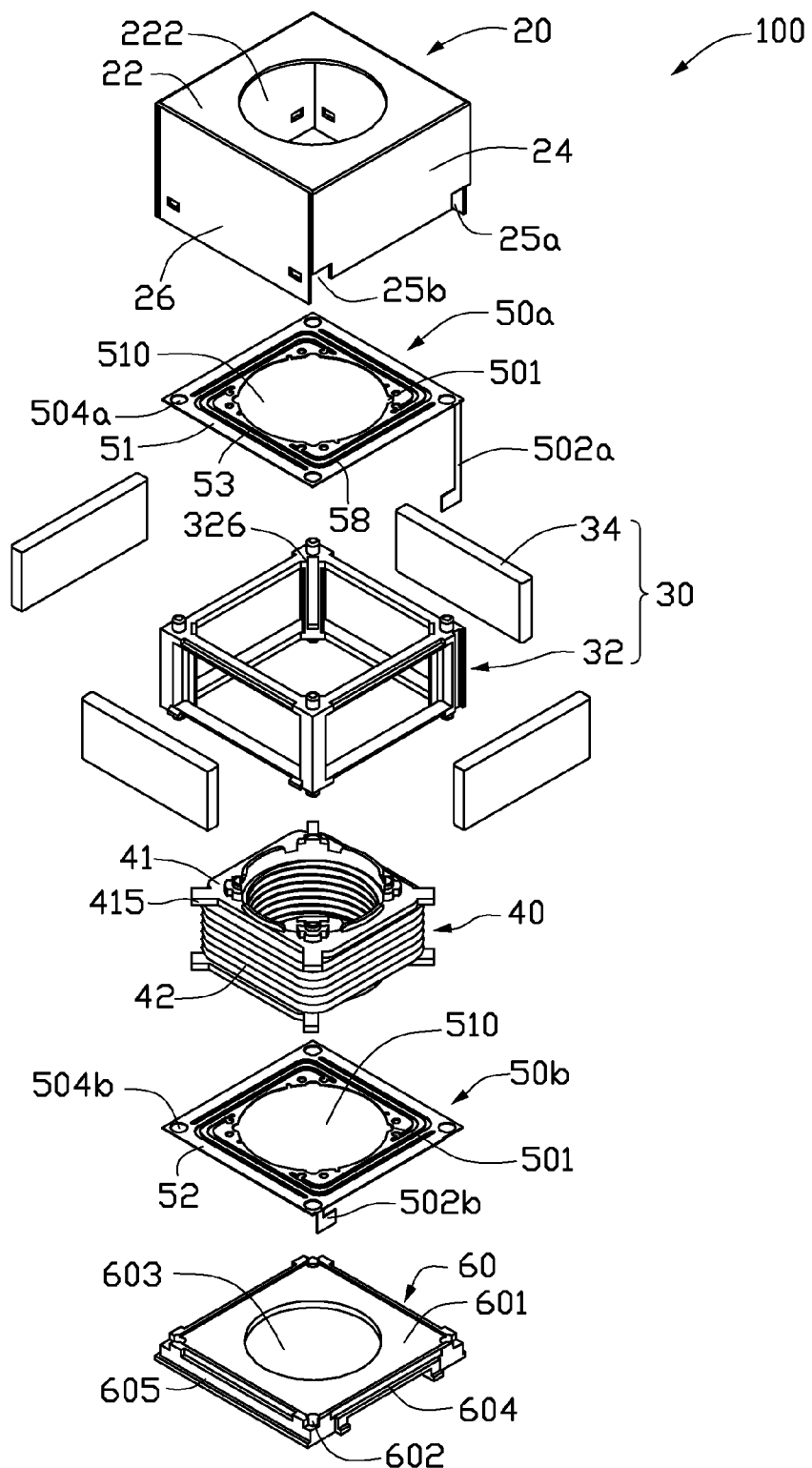
FIG. 2 is an exploded view of the voice coil motor of FIG. 1.
Figure 3:
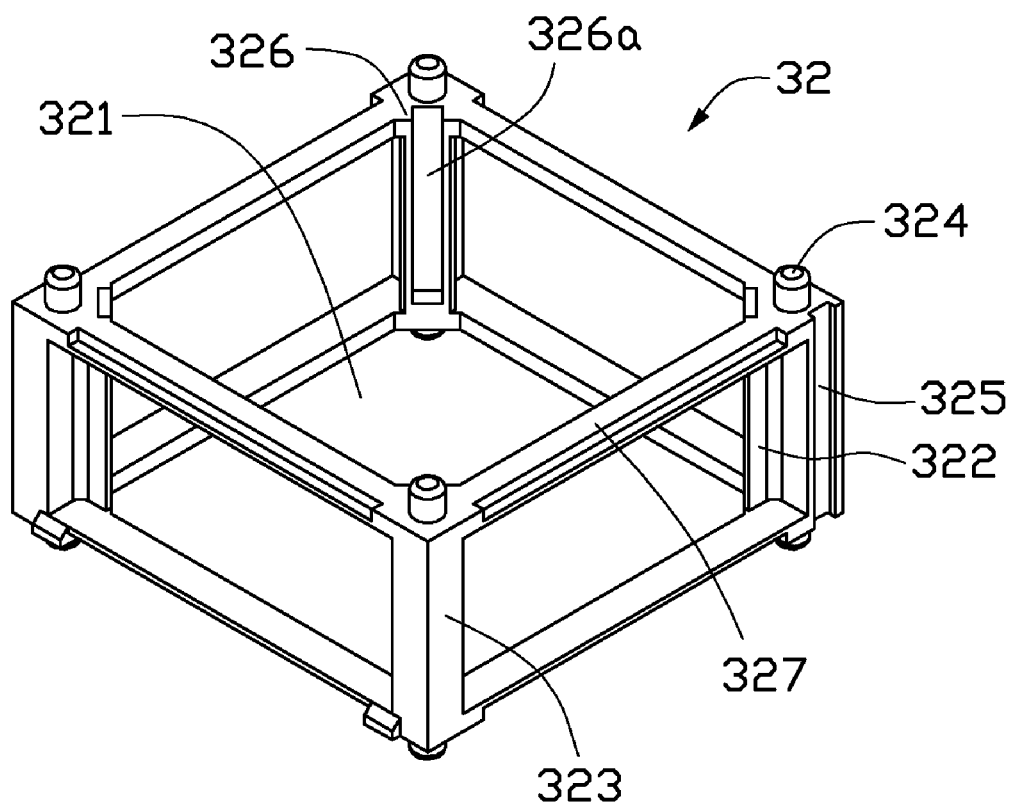
FIG. 3 is an isometric and schematic view of a supporting frame of the voice coil motor of FIG. 2.
Figure 4:
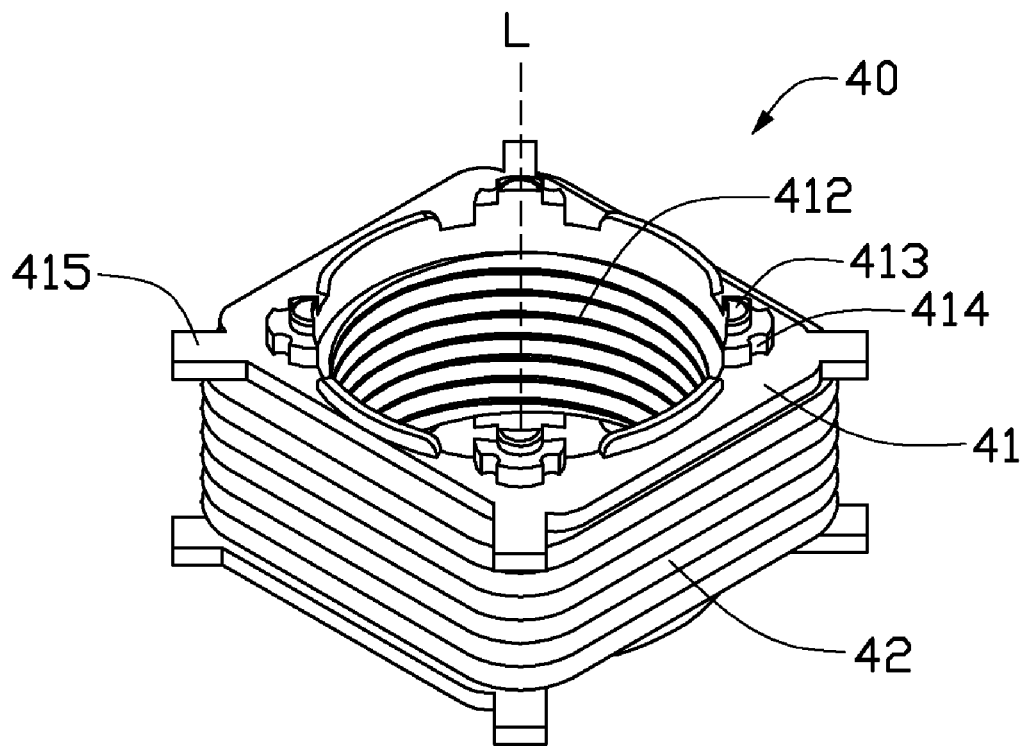
FIG. 4 is an isometric and schematic view of a moveable magnetic field generator of the voice coil motor of FIG. 2.

Referring to FIGS. 1-2, a voice coil motor 100 (VCM), according to a first exemplary embodiment, includes a case 65, a stationary magnetic field generator 30, a moveable magnetic field generator 40, and an elastic assembly.

The case 65 is substantially cuboid-shaped and is configured for receiving the stationary magnetic field generator 30, the moveable magnetic field generator 40, and the elastic assembly. In this embodiment, the case 65 includes an upper cover 20 and a lower cover 60.

The upper cover 20 includes an upper plate 22, two first side plates 24, and two second side plates 26. The two first side plates 24 face each other and substantially extend perpendicularly from two sides of the upper plate 22. The two second side plates 26 face each other and extend substantially perpendicularly from other two sides of the upper plate 22. The upper plate 22 has a first through hole 222 defined in a center thereof. One of the first side plates 24 has a first cutout 25a and a second cutout 25b defined at a distal end thereof. The first cutout 25a and the second cutout 25b are at opposite sides of the distal end of the first side plate 24. The upper cover 20 is made from an electromagnetic shielding material, such as copernik, conductive plastic, or conductive glass to achieve an electromagnetic shielding function.

The stationary magnetic field generator 30 is configured for generating a first magnetic field. Referring to FIGS. 2-5, the stationary magnetic field generator 30 includes a supporting frame 32 and four permanent magnetic elements 34 mounted on the supporting frame 32.

The supporting frame 32 is substantially a cuboid frame and has a first receiving space 321 defined therein. The first receiving space 321 is configured for receiving the moveable magnetic field generator 40. The supporting frame 32 includes four longitudinal posts 323 and eight latitudinal posts 327. Two of the latitudinal posts 327 connect to two of the adjacent longitudinal posts 323 correspondingly. The longitudinal posts 323 and the latitudinal posts 327 at each side of the supporting frame 32 cooperatively form a first receiving recess 322. The first receiving recess 322 is in communication with the first receiving space 321. The permanent magnetic elements 34 are received in the first receiving recesses 322 correspondingly, thereby mounted to the peripheral sides of the supporting frame 32 correspondingly, and serve as sidewalls of the stationary magnetic field generator 30.

Two first positioning posts 324 extend along an axial direction of the longitudinal post 323 from two opposite ends of each longitudinal post 323. An elongated groove 325 is defined along the axial direction of the longitudinal post 323 in a side surface of one of the longitudinal posts 323 facing away from the first receiving space 321. The supporting frame 32 further includes four first stopping portions 326 formed at four inner corners thereof. Each first stopping portion 326 includes a stopping groove 326a defined along the axial direction of the longitudinal post 323 in a side surface of each longitudinal post 323 in the first receiving space 321.

The moveable magnetic field generator 40 is moveably received in the first receiving space 321. The moveable magnetic field generator 40 includes a hollow core member 41, and a coil 42 wrapped around the core member 41. The core member 41 defines a second receiving space 412 in a center thereof. The second receiving space 412 is configured for receiving a lens module therein. An optical axis of the lens module may coincide with a central axis L of the core member 41. The top end and the bottom end of the core member 41 each includes four second positioning posts 413 and four second stopping portions 415. Each second stopping portion 415 is a stopping protrusion 415. The four second positioning posts 413 extend away from each of the top and bottom ends of the core member 41 parallel to the central axis L of the core member 41. The four second stopping portions 415 extend away from each of the top and bottom ends of the core member 41 perpendicular to the central axis L of the core member 41. Therefore, a pair of the second stopping portions 415 is formed at each outer corner of the core member 41 for engagement with the respective first stopping portion 326. The core member 41 has two second receiving recesses 414 defined adjacent to each second positioning post 413 in each of the top and bottom ends of the core member 41. The second receiving recess 414 is configured for receiving adhesive substance.

The elastic assembly elastically connects the stationary magnetic field generator 30 and the moveable magnetic field generator 40. In this embodiment, referring to FIG. 2, the elastic assembly includes a first elastic member 50a, and a second elastic member 50b. Each of the first elastic member 50a and the second elastic member 50b is substantially a rectangular sheet, with a second through hole 510 defined in a center thereof. Each of the first elastic member 50*a* and the second elastic member 50*b* is made from metal, such as copper or gold.

The first elastic member 50*a* includes a plurality of generally rectangular (frame-shaped) elastic portions 53 defined around the second through hole 510, and a peripheral portion 51 defined around the elastic portions 53. The elastic portions 53 are separated from each other by a plurality of slots 58 defined in the first elastic member 50*a*, thereby enabling the elastic portions 53 to have elasticity. In the illustrated embodiment, there are four slots 58, each of which is generally U-shaped. The first elastic member 50*a* also has four guiding holes 501, and four first positioning holes 504*a* defined therein. The guiding holes 501 are defined in an inner peripheral wall of the first elastic members 50*a*. In the illustrated embodiment, the guiding holes 501 are in the form of cutouts, which are in communication with the second through hole 510. The first positioning holes 504*a* are defined in the peripheral portion 51, corresponding to the four first positioning posts 324 at a top end of the supporting frame 32 facing the first elastic member 50*a*. The first elastic member 50*a* further includes a first conductive terminal 502*a*. The first conductive terminal 502*a* is connected substantially perpendicularly to the peripheral portion 51 adjacent to the first positioning hole 504*a*. The first conductive terminal 502*a* is substantially L-shaped and is electrically connected to one terminal of the coil 42.

Structure of the second elastic member 50*b* is similar to that of the first elastic member 50*a*, but a second conductive terminal 502*b* of the second elastic member 50*b* is shorter than the first conductive terminal 502*a* of the first elastic member 50*a*. The second conductive terminal 502*b* is electrically connected to another terminal of the coil 42. Therefore, the coil 42 can be electrically connected to outer controlling circuits (not shown) using the first conductive terminal 502*a* and the second conductive terminal 502*b*.

The lower cover 60 includes a third through hole 603 defined in a center thereof, and four notches 602 defined in a top surface 601 thereof. The lower cover 60 further defines two first grooves 604 on two of opposite sides thereof, and two second grooves 605 on another two of opposite sides thereof. The first through hole 222, the second through hole 510 and the third through hole 603 are aligned with each other and are in communication with the second receiving space 412. The lower cover 60 is made from an electromagnetic shielding material, such as copernik, conductive plastic, or conductive glass.

Figure 5:
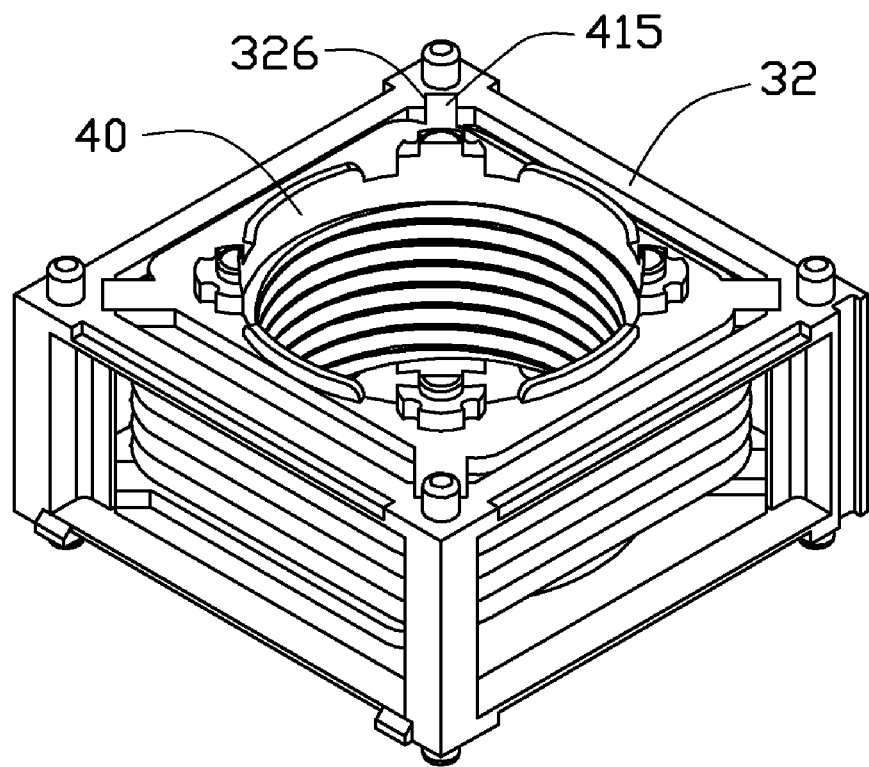
FIG. 5 is a partially assembled view of the voice coil motor of FIG. 2.

In assembly of the VCM 100, the moveable magnetic field generator 40 is received in the first receiving space 321 of the supporting frame 32, with each pair of the second stopping portions 415 slidably engaged with the corresponding first stopping portion 326 (see FIG. 5). The first positioning posts 324 at the top end of the longitudinal post 323 extend fixedly through the first elastic member 50*a* at the respective first positioning holes 504*a* of the first elastic member 50*a* to position the first elastic member 50*a* on the supporting frame 32. The first positioning posts 324 at the bottom end of the longitudinal post 323 extend fixedly through the second elastic member 50*b* at the respective second positioning holes 504*b* of the second elastic member 50*b* to position the second elastic member 50*b* on the supporting frame 32. The peripheral portion 51 of the first elastic member 50*a* and a peripheral portion 52 of the second elastic members 50*b* are fixed in position at inmost ends of the corresponding four first positioning posts 324, with the peripheral portions 51, 52 abutting the respective top or bottom end of the supporting frame 32. The second positioning posts 413 at the top end of the core member 41 extend through the first elastic member 50*a* at the guiding hole 501 of the first elastic member 50*a* to position the first elastic member 50*a* on the core member 41. The second positioning post 413 at the bottom end of the core member 41 extend through the second elastic member 50*b* at the guiding holes 501 of the second elastic member 50*b* to position the second elastic member 50*b* on the core member 41.

The first positioning posts 324 at the bottom end of the supporting frame 32 are positioned in the notches 602 of the lower cover 60. In one embodiment, these bottom first positioning posts 324 are fittingly received in the notches 602 and thereby fixed in position. Thus, the stationary magnetic field generator 30 is attached to the lower cover 60. The second positioning posts 413 at the bottom end of the core member 41 contact the top surface 601 of the lower cover 60. Then the upper cover 20 is lowered onto the lower cover 60. The upper cover 20 is thereby mounted to the lower cover 60, with bottom ends of the first side plates 24 of the upper cover 20 being received in the first grooves 604, and bottom ends of the second side plates 26 of the upper cover 20 being received in the second grooves 605. A distal end of the first conductive terminal 502*a* is exposed by the first cutout 25*a*. A distal end of the second conductive terminal 502*b* is exposed by the second cutout 25*b*. Thus, assembly of the VCM 100 is completed.

In use of the VCM 100, when a current is applied to the coil 42 of the moveable magnetic field generator 40 using the first and second conductive terminals 502*a*, 502*b*, a second magnetic field is generated by the moveable magnetic field generator 40. If the second magnetic field opposes the first magnetic field generated by the stationary magnetic field generator 30, the moveable magnetic field generator 40 is repelled to move away from the stationary magnetic field generator 30, i.e., away from the lower cover 60 in the present embodiment.

When the current applied to the coil 42 is cut off, the moveable magnetic field generator 40 returns to its starting point due to rebounding of the first and second elastic members 50*a*, 50*b*, with the second positioning posts 413 at the bottom end of the core member 41 again contacting the top surface 601 of the lower cover 60.

When a lens module (not shown) is screwed into the core member 41 of the moveable magnetic field generator 40, the core member 41 is prevented from rotating about the central axis L of the core member 41 with the lens module because the second stopping portions 415 are engaged with the corresponding first stopping portion 326. Therefore, the elastic assembly can be protected. This increases reliability of the VCM 100. Further, the first stopping portions 326 including the stopping groove 326*a* and the second stopping portions 415 can serve as guiding means for the moveable magnetic field generator 40 to move along the axial direction of the longitudinal post 323, i.e., along the central axis L of the core member 41.

Figure 6:
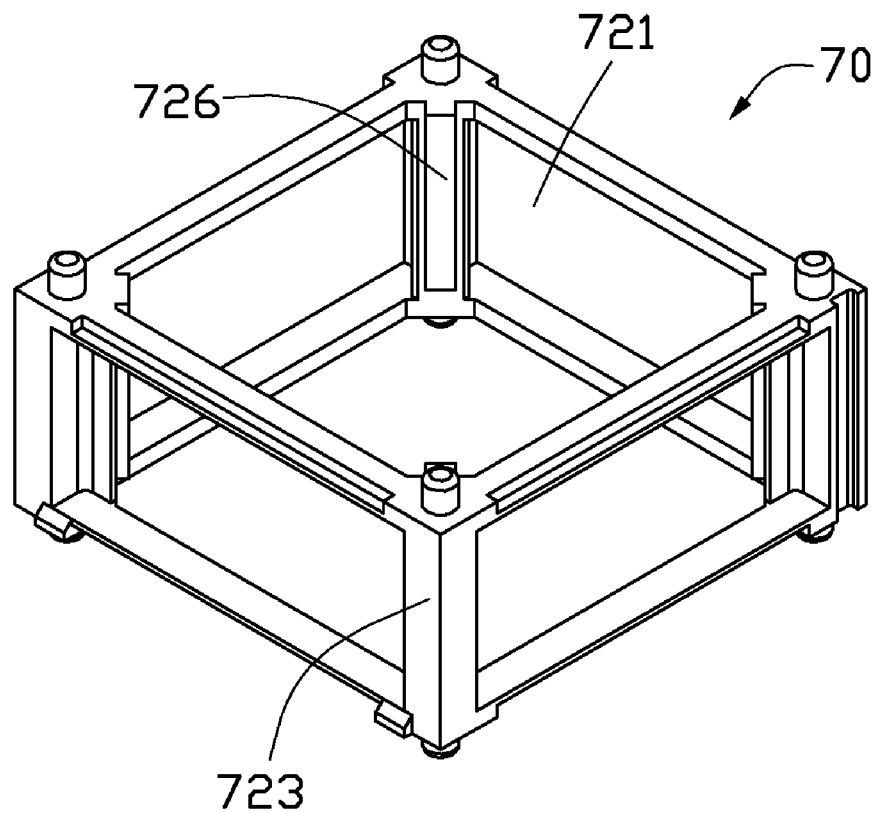
FIG. 6 is an isometric and schematic view of a supporting frame of a voice coil motor, according to a second exemplary embodiment.
Figure 7:
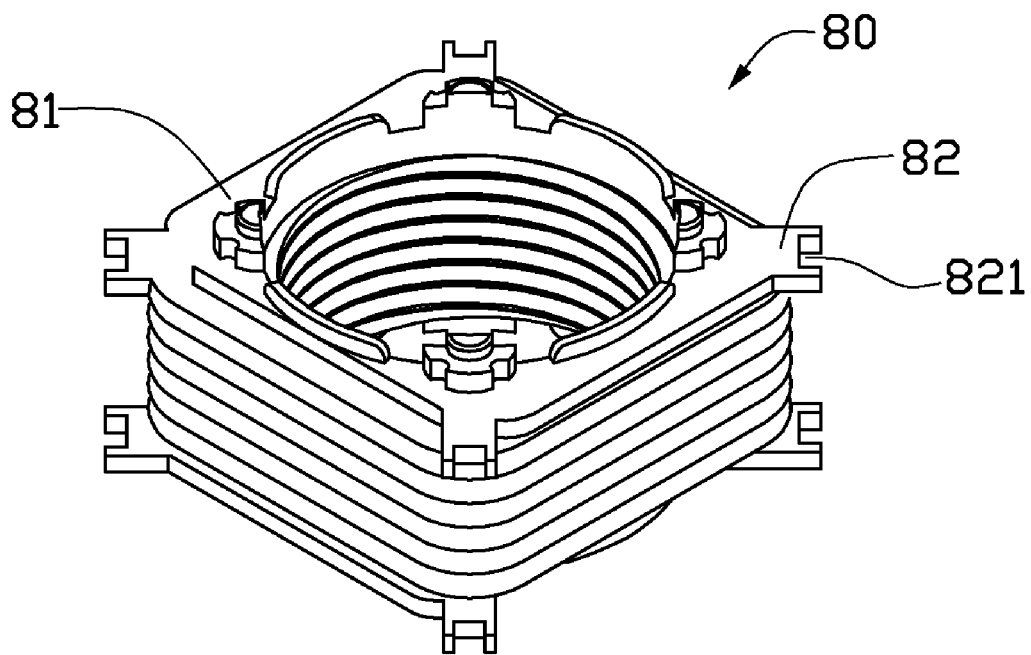
FIG. 7 is an isometric and schematic view of a moveable magnetic field generator of the voice coil motor, according to the second exemplary embodiment.

Referring to FIGS. 6-7, a VCM, according to a second exemplary embodiment, is shown. Differences between the VCM of the this embodiment and the VCM 100 of the first embodiment are that a supporting frame 70 and a moveable magnetic field generator 80 of the VCM of this embodiment differ.

In this embodiment, each of the four first stopping portions 726 of the supporting frame 70 is a stopping protrusion instead of defining a stopping groove. The first stopping portion 726 extends along the axial direction of each longitudinal post 723 at a side surface of the longitudinal post 723 in the first receiving space 721.

Each second stopping portion 82 of a core member 81 has a stopping cutout 821 defined in a distal end of the second stopping portion 82. When the moveable magnetic field generator 80 is received in the supporting frame 70, each first stopping portion 726 is slidably engaged in the corresponding cutout 821 of the second stopping portion 82.

Advantages of the VCM of the second exemplary embodiment are similar to those of the VCM 100 of the first exemplary embodiment.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A voice coil motor, comprising:
a stationary magnetic field generator comprising a supporting frame and a plurality of permanent magnetic elements mounted to peripheral sides of the supporting frame, the supporting frame having a first receiving space defined therein and comprising at least one first stopping portion formed in the first receiving space;
a moveable magnetic field generator moveably received in the first receiving space, the moveable magnetic field generator comprising a core member and a coil wrapped around the core member, the core member comprising at least one second stopping portion configured for engaging with the at least one first stopping portion to prevent the moveable magnetic field generator from rotating about a central axis of the core member; and
an elastic assembly elastically connecting the moveable magnetic field generator and the stationary magnetic field generator, the elastic assembly configured for moving the moveable magnetic field generator relative to the stationary magnetic field along the central axis of the core member.

2. The voice coil motor of claim 1, wherein the supporting frame is substantially a cuboid frame and comprises four longitudinal posts and eight latitudinal posts, the longitudinal posts and the latitudinal posts at each side of the supporting frame cooperatively forming a first receiving recess, the first receiving recess being in communication with the first receiving space, the permanent magnetic elements received in the first receiving recesses respectively, the at least one first stopping portion comprising four first stopping portions, each first stopping portion comprising a stopping groove defined along an axial direction of the longitudinal post in a side surface of each longitudinal post in the first receiving space.

3. The voice coil motor of claim 2, wherein the at least one second stopping portion comprises four pairs of second stopping portions, each pair of second stopping portions extending substantially perpendicularly to the central axis of the core member and engaged with the corresponding first stopping portion.

4. The voice coil motor of claim 3, wherein each of the second stopping portions is a stopping protrusion.

5. The voice coil motor of claim 2, wherein the supporting frame comprises two first positioning posts extending along the axial direction of the longitudinal post from opposite ends of each longitudinal post, an elongated groove defined along the axial direction of the longitudinal post in a side surface of one of the longitudinal posts facing away from the first receiving space.

6. The voice coil motor of claim 5, wherein the core member comprises four second positioning posts extending from each of top and bottom ends thereof parallel to the central axis of the core member.

7. The voice coil motor of claim 6, wherein the elastic assembly comprises a first elastic member and a second elastic member, each of the first elastic member and the second elastic member is substantially a rectangular sheet, with a through hole defined in a center thereof.

8. The voice coil motor of claim 7, wherein the first positioning posts at top ends of the longitudinal posts extend through the first elastic member to position the first elastic member on the supporting frame, and the first positioning posts at opposite bottom ends of the longitudinal posts extend through the second elastic member to position the second elastic member on the supporting frame.

9. The voice coil motor of claim 8, wherein the second positioning posts at the top end of the core member extend through the first elastic member to position the first elastic member on the core member, and the second positioning posts at the bottom end of the core member extend through the second elastic member to position the second elastic member on the core member.

10. The voice coil motor of claim 1, further comprising a case configured for receiving the stationary magnetic field generator, the moveable magnetic field generator, and the elastic assembly.

11. The voice coil motor of claim 1, wherein the supporting frame is substantially a cuboid frame and comprises four longitudinal posts and eight latitudinal posts, the longitudinal posts and latitudinal posts at each side of the supporting frame cooperatively forming a first receiving recess, the first receiving recess bounded being in communication with the first receiving space, the permanent magnetic elements received in the respective first receiving recesses, the at least one first stopping portion comprising four first stopping portions, each first stopping portion being a stopping protrusion extending along an axial direction of the longitudinal post at a side surface of each longitudinal post in the first receiving space.

12. The voice coil motor of claim 11, wherein the at least one second stopping portion comprises four pairs of second stopping portions, each pair of second stopping portions extending substantially perpendicularly to the central axis of the core member and engaged with the corresponding first stopping portion.

13. The voice coil motor of claim 12, wherein each of the second stopping portions has a cutout defined in a distal end of the second stopping portion for engagement with the first stopping portion.

* * * * *